United States Patent [19]
Carey

[11] 3,965,745
[45] June 29, 1976

[54] EXTERNALLY MOUNTED TRANSDUCER FOR DETECTING CHANGES OF FLUID PRESSURE IN A PIPE

[75] Inventor: Thomas H. Carey, Chester, Pa.

[73] Assignee: Columbia Research Laboratories, Inc., Woodlyn, Pa.

[22] Filed: Feb. 5, 1975

[21] Appl. No.: 547,342

[52] U.S. Cl. .................. 73/398 AR; 73/88.5 SD
[51] Int. Cl.² ........................................ G01L 9/06
[58] Field of Search ....... 73/398 AR, 119 A, 141 A, 73/88.5 SD, 406; 338/4

[56] References Cited
UNITED STATES PATENTS 3,535,937  10/1970  Wiggins et al. .................. 73/141 A
3,698,248  10/1972  Vasek ............................. 73/398 AR

*Primary Examiner*—Donald O. Woodiel
*Attorney, Agent, or Firm*—William E. Cleaver

[57] ABSTRACT

The present device provides a pressure-responsive transducer which fits externally onto a fluid carrying pipe, or conduit, and which transducer contacts the pipe at a plurality of tangential points. Said tangential points are located in a plane which lies substantially orthogonally to the axis of said fluid carrying pipe. In addition, the present system employs a circuit which is connected to said transducer and said circuit is particularly designed to eliminate background noise and spurious signals.

9 Claims, 2 Drawing Figures

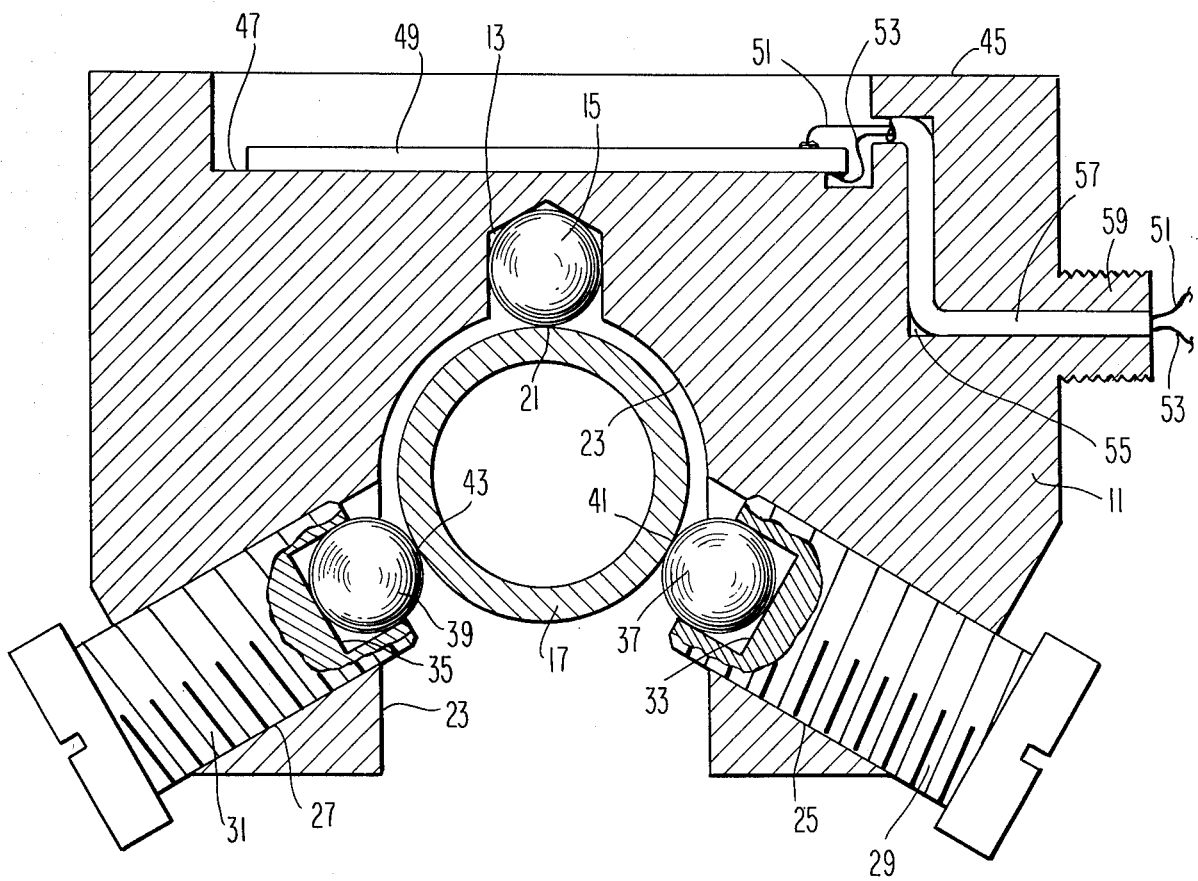

EXTERNALLY MOUNTED TRANSDUCER FOR DETECTING CHANGES OF FLUID PRESSURE IN A PIPE

BACKGROUND

In monitoring or detecting changes of fluid pressure, or surges of fluid, within a pipe, or conduit, it has been and is the practice to cut into the pipe and insert an "in line" transducer within the pipe. In the prior art, such transducers have included quartz crystal type transducers, strain gage type transducers and vane type (mechanical type) transducers. All of the foregoing transducers have been less than completely satisfactory because they have to be inserted into the pipe, or conduit, which in itself creates problems. Once inserted in the pipe, such transducers are subject to the adverse effects of the fluid per se, chemical reactions therewith, dirt found therein and large direct changes of pressure therefrom. Under such continual adverse situations, the foregoing transducers have often failed. In one application, namely the monitoring of diesel fuel injections into a diesel engine, for the purpose of "timing" or "tuning" or adjusting a diesel engine, the use of the "in-line" transducer is generally employed and it gives rise to problems. In diesel engine operation, a pump is employed to pump fuel, or inject fuel, into each chamber of the engine wherein there is a piston moving up and down to compress the fuel and simultaneously increase its temperature until it (the fuel) explodes or "fires." The time during the piston stroke at which the fuel is injected is somewhat critical for efficient operation. The fuel is pumped by the pump to each chamber in some form of serial mode depending on the number of cylinders or chambers in the engine. Accordingly each of the pipes from the pump to the chambers is of equal length so that the fuel injected into chamber number one is injected at a time relative to the position of the piston in chamber number one, which is the same as the time of the fuel injection into chamber number two relative to the position of the piston in chamber number two and so on for each of the chambers and its associated piston.

It becomes apparent then that if a fuel line from the pump to a chamber is cut and separated so that an "in line" transducer can be added then the time for the fuel to leave the pump and pass into the chamber (connected to the increased fuel line) is increased. The increased fuel line changes the "timing" for its associated chamber and this is highly undesirable.

Accordingly it is the practice to cut away part of the fuel line into which the "in line" transducer is inserted, by an amount equal to the length of the "in line" transducer so that when the transducer is added to the shortened fuel line, the overall length is the same as the length of each of the fuel lines to the pump which have not been shortened. The present transducer arrangement eliminates the need for an "in line" transducer which, of course, eliminates the need for cutting into the fuel line, shortening the fuel line, and exposing the transducer to the adverse effects (mentioned earlier) of being immersed directly in a fluid flow having a varying pressure characteristic.

SUMMARY

In the preferred embodiment, the present invention comprises a yoke means which is mounted externally on a pipe, or conduit, by means of three ball type elements. The ball type elements each contact, or touch, the pipe at a different tangential point and the tangential points lie in a plane. It is only when the hole in said plane, defined by the three tangential points, expands and contracts, that the yoke bends and subsequently returns to its normal position. The bending of the yoke under the conditions just described becomes meaningful when it is understood that the invention further includes a piezo electric crystal which is mounted in said yoke. As the yoke expands, the piezo electric crystal bends and generates a voltage signal. Said pipe at said "hole" in said plane will expand repeatedly in response to repeated surges, or changes, of fluid pressure in said pipe. Hence a plurality of electrical signals are produced which represent timing pulses occurring at the times of the surges of pressure in the fluid (in the pipe).

In addition the present invention includes a circuit which is connected to the transducer and eliminates background noise and spurious signals so that the pulses which are ultimately generated are truly representative of the timing of the changes of pressure in the fluid in the pipe.

The objects and features of the present invention will be better understood from the following description taken in conjunction with the drawings in which:

FIG. 1 is a schematic end view of the transducer coupled onto a pipe; and

FIG. 2 is a schematic-block diagram of the circuit employed with the transducer.

The present invention is described, in a preferred embodiment, as being employed with a fuel line system of a diesel engine to check the timing of the fuel injections. Indeed the use of the present transducer system with the fuel lines of a diesel engine fuel pump for "tuning" a diesel engine has been a most successful use but it should be understood that the present transducer system can be employed in other modes of operation to detect or monitor changes of pressure in a fluid which is flowing or is contained in a pipe or other form of conduit, irrespective of whether or not the fluid flow is in a diesel engine fuel line.

Consider FIG. 1 wherein there is shown a housing element 11 which has been sectionalized in order that other elements of the transducer assembly can be better depicted. In the preferred embodiment, housing element 11 is made of stainless steel. In the center of the housing element 11, there is a slot 13 cut and into the slot 13 there is press-fitted a ball bearing 15. The ball bearing 15 provides one of the contact means with which the transducer assembly comes in contact with the pipe 17. The pipe 17 represents the pipe or conduit through which the fluid flows. In the example under study, the pipe 17 is a diesel fuel line. As can be seen from FIG. 1 and as can be understood from a general knowledge about the configuration of a ball (bearing), the ball bearing 15 only comes in contact with pipe 17 at a tangential point 21.

As can be further seen in FIG. 1, the housing element 11 has a large cut out 23 formed therein which cut out is large enough to fit over the pipe 17.

In addition there are two threaded apertures (or holes) 25 and 27 formed in the housing element 11. Threaded into the apertures 25 and 27 are two bolt-like members 29 and 31. The bolt-like members 29 and 31 each respectively has a notch cut therein. Bolt-like member 29 has notch 33 cut therein while bolt-like member 31 has notch 35 cut therein. Into notch 33 there is press-fitted a ball bearing 37, while into notch 35 there is press-fitted a ball bearing 39. As can be gleaned from FIG. 1 and from an understanding of the shapes of the ball bearings, ball bearing 37 comes in contact with pipe 17 only at tangential point 41 and ball bearing 39 comes in contact with pipe 17 only at tangential point 43. Now while the preferred embodiment describes the use of ball bearings for the contact points, it should be understood that other forms of contacts could be used. For instance the bolts themselves could be shaped to have a partially spherical end, or a pear-shaped insert could be used instead of a ball bearing, or ball bearings per se could be press-fitted into cavities in said housing. The prerequisite for the contact point element is that it should come in contact with the pipe at a tangential point. The three tangential points 21, 41 and 43 lie in a plane and define a "hole" therein. When pipe 17 expands, said hole in said plane expands and therefore the housing element 11 is bent concave along its upper surface 45 in response to the spreading or widening of the cut out 23.

In the upper part of the housing element 11 there is a shelf 47 formed. A piezo electric crystal 49 is secured to said shelf 47. A pair of electrically conducting leads 51 and 53 are connected to the upper and lower faces of piezo-electric crystals 49. The leads 51 and 53 are passed through the channel 55 and through the cable sheath 57 and through the threaded stud 59, to be connected to the monitoring circuit shown in FIG. 2 or to some other monitoring circuit.

In operation when there is a surge of pressure of the fluid in pipe 17, the fluid pressure pushes on the ball bearings 15, 37 and 39, respectively at the tangential points 21, 41 and 43. In response to this push on the ball bearings, the cut out 23 is spread or widened which flexes the piezo electric crystal 49. The piezo electric crystal 49 in turn responds to such bending to produce a voltage signal each time there is a surge or change of pressure. It becomes apparent then that when used with a diesel engine to detect fuel injections, each time the pump acts to pump fuel, the surging fuel will cause a voltage signal to be generated. It should be noted that only when the pipe 17 expands at the plane defined by the tangential points 21, 41 and 43 does the piezo-electric crystal 49 generate a major signal. If the monitor assembly were in contact with the pipe 17 along the surface of the pipe or even along a line lying axial with the pipe, then if the pipe were bent due to outside forces, such as linear vibrations or flexures of the pipe due to heavy operating machinery (e.g. diesel pumps, diesel engines, and the like) then spurious major signals would be generated and interpreted by the electronic circuitry as fuel injections. The reference has been made to major signals indicating surges of fluid or pressure changes in the fluid. Even with the monitor having tangential point contact, occasionally there is "noise" generated due to the planar or orthogonal vibrations created by the machinery with which the system is used, but this "noise" does not constitute major signals.

Consider now FIG. 2, which shows the piezo electric crystal 49 connected to a buffer amplifier 61. In the preferred embodiment, buffer amplifier 61 is an ICL 8007 manufactured by Intersil, Inc. Other similar amplifiers can be used. It should be understood that the other parts of the monitor assembly were not shown to simplify the description, but that actually the piezo electric crystal 49 is operating with the elements shown in FIG. 1.

The piezo electric crystal 49 is generating pulses representing fuel injections and these pulses are low frequency signals. In addition, on occasion, the piezo electric crystal is generating both low frequency and high frequency noise due to the planar or orthogonal vibrations of the entire assembly. All of the signals generated by the piezo-electric crystal 49 are amplified by the buffer amplifier 61. These signals are transmitted to the low pass filter 63 whereat the high frequency noise signal, if any be present, is removed.

Thereafter the low frequency signals comprised of the pressure pulses and the low frequency noise (if any be present) are amplified at the amplifier 65. In the preferred embodiment, amplifier 65 is a MC 1741 manufactured by Motorola Semiconductor Corporation. Other similar amplifiers can be used. The amplified low frequency signals are transmitted through the rectifier 67 as well as to the rheostat or pot 69. At the rectifier 67 the signal is converted to a d.c. level or average signal and transmitted to the comparator 71. The non-rectified signals are transmitted from the rheostat 69, to the comparator 71, and the output from the comparator 71 is a plurality of pulses representing the major pulses generated by the piezo-electric crystal 49 in response to the fluid surges, or pressure changes of the fluid in the pipe. The rectifier 67 in the preferred embodiment utilizes an MC 1741. The comparator 71 in the preferred embodiment is a MC 1741. It should be understood that similar components by other manufacturers can be used. The pot 69 provides a means to adjust the amplitude of the signal being sent to the comparator 71.

The pulse signals from the comparator 71 are transmitted to the monostable multivibrator 73 whereat they are converted into square wave pulses and the timing of the leading edges of the square wave pulses (the duty cycle) is proportional to the fuel injections. Accordingly the leading edges of the square wave signals provide signals to fire a strobe lamp or some other form of monitoring device or circuit so that the diesel engine can be timed and/or tuned.

I claim:

1. An externally mounted device for detecting changes of fluid pressure in a pipe comprising in combination: housing means having a cut-away section therein formed to fit over said pipe; notch means formed in said housing means and formed to open into said cut-away section; first contact means disposed in said notch means and formed to have a substantially spherical surface extending into said cut-away section so that said first contact means only contacts said pipe at a first tangential point; first and second cavity means formed in said housing means and formed to open into said cut-away section; second contact means disposed in said first cavity means and formed to have a substantially spherical surface extending into said cut-away section so that said second contact means only contacts said pipe at a second tangential point; third contact means disposed in said second cavity means and formed to have a substantially spherical surface extending into said cutaway section so that said third contact means only contacts said pipe at a third tangential point and said third contact means disposed so that said first, second and third tangential points lie in a plane and define a hold in said plane into which said pipe can be disposed; and piezo-electric crystal means mounted in said housing means whereby when a change of fluid pressure occurs in fluid passing through said pipe, said first, second and third contact means will respond to flex said housing means, which in turn will bend said piezo-electric crystal, to thereby produce voltage signals in accordance with said change of pressure in said pipe.

2. An externally mounted device according to claim 1 wherein said first contact means is a ball bearing which is press-fitted into said notch.

3. An externally mounted device according to claim 1 wherein said first cavity means is a threaded aperture passing from the outside surface of said housing means and opening into said cut away section and further wherein said second contact means comprises a bolt-type means threadably engaged in said last mentioned aperture and whose end structure constitutes said substantially spherical surface.

4. An externally mounted device according to claim 3 wherein said end structure comprises a ball bearing held by said bolt type means.

5. An externally mounted device according to claim 1 wherein said second contact means comprises a ball bearing.

6. An externally mounted device according to claim 1 wherein said second cavity means is a threaded aperture passing from the outside surface of said housing means and opening into said cut away section and further wherein said third contact means comprises a bolt type means threadably engaged in said last mentioned aperture and whose end structure which extends into said cut-away section is formed into a spherical surface.

7. An externally mounted device according to claim 6 wherein said end structure comprises a ball bearing held by said bolt type means.

8. An externally mounted device according to claim 1 wherein said third contact means comprises a ball bearing.

9. An externally mounted device according to claim 1 wherein said housing has a second cut-away section therein and wherein said piezo-electric crystal means is disposed in said second cut-away section.

* * * * *